Oct. 24, 1950           R. E. CLAPP           2,527,477
CONTROL OF THE VELOCITY OF PHASE PROPAGATION
OF ELECTRIC WAVES IN WAVE GUIDES

Filed Feb. 1, 1944           4 Sheets-Sheet 1

Inventor
ROGER E. CLAPP

By *J. J. Fitzgerald*
Attorney

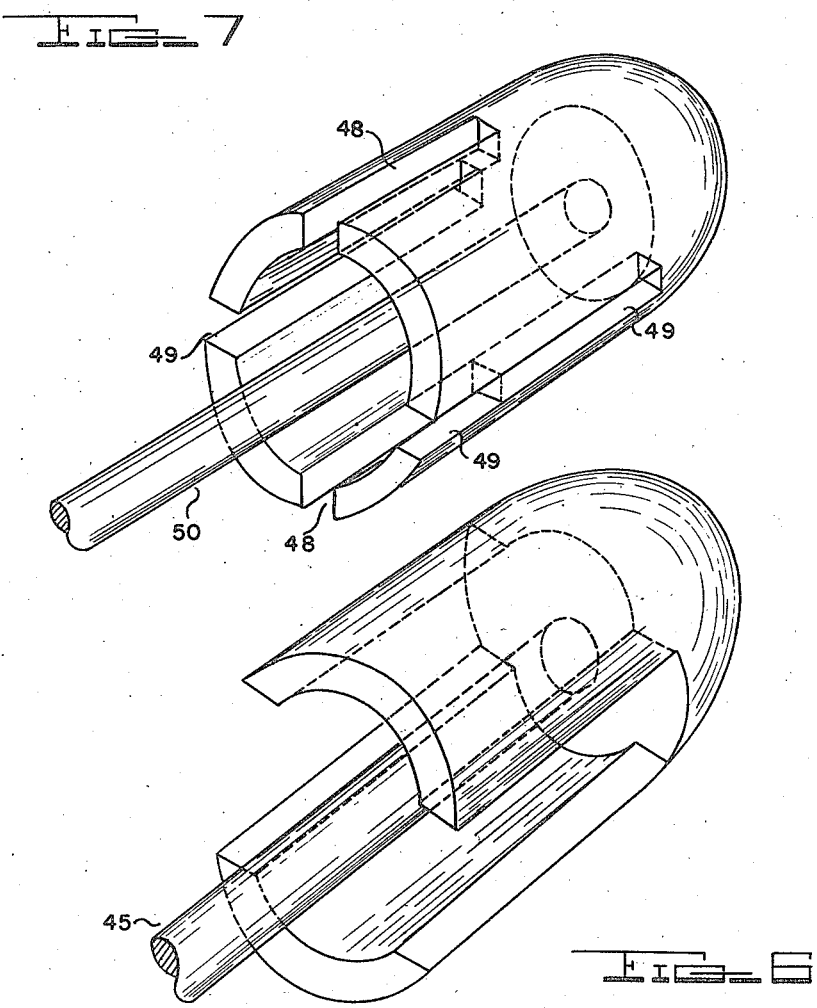

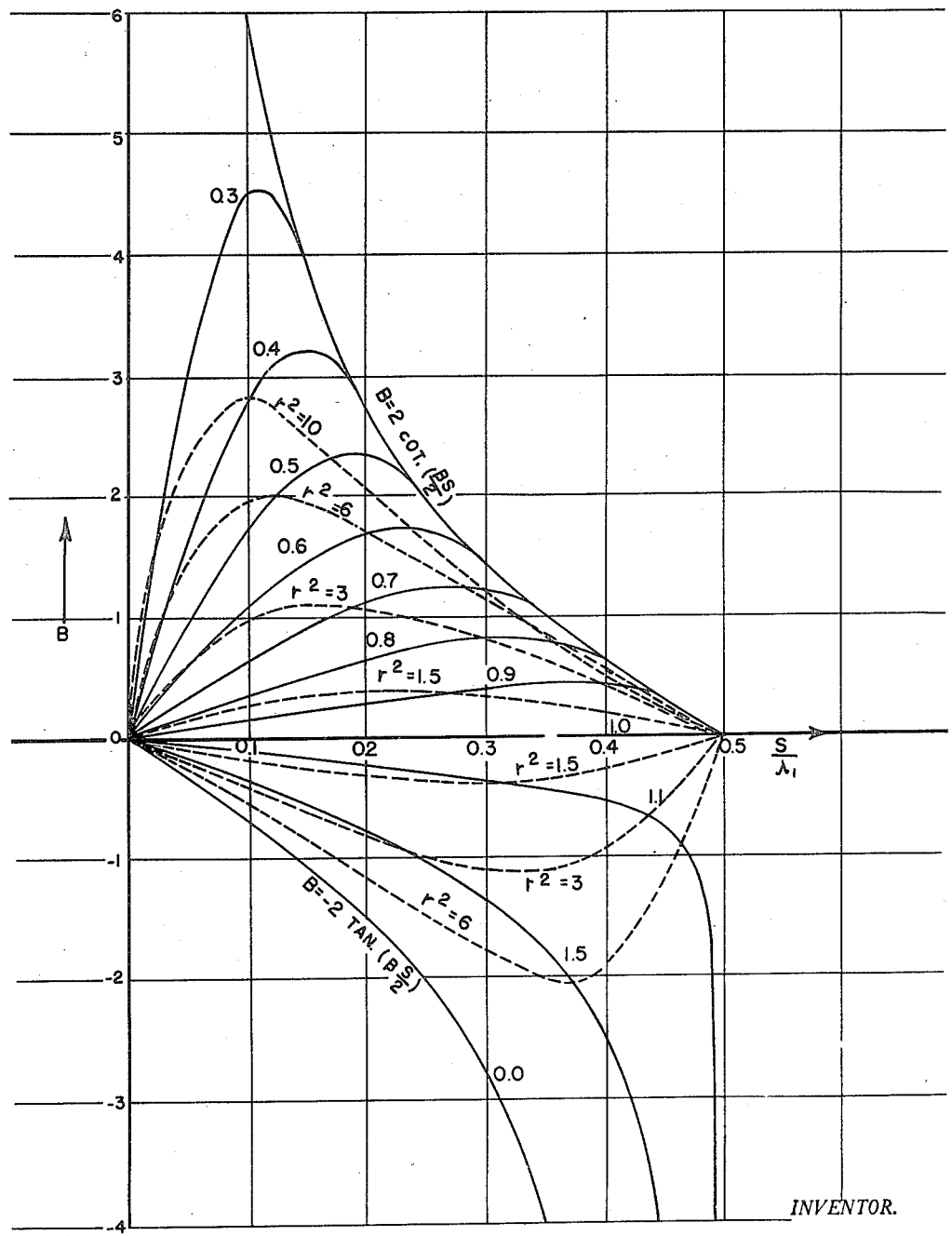

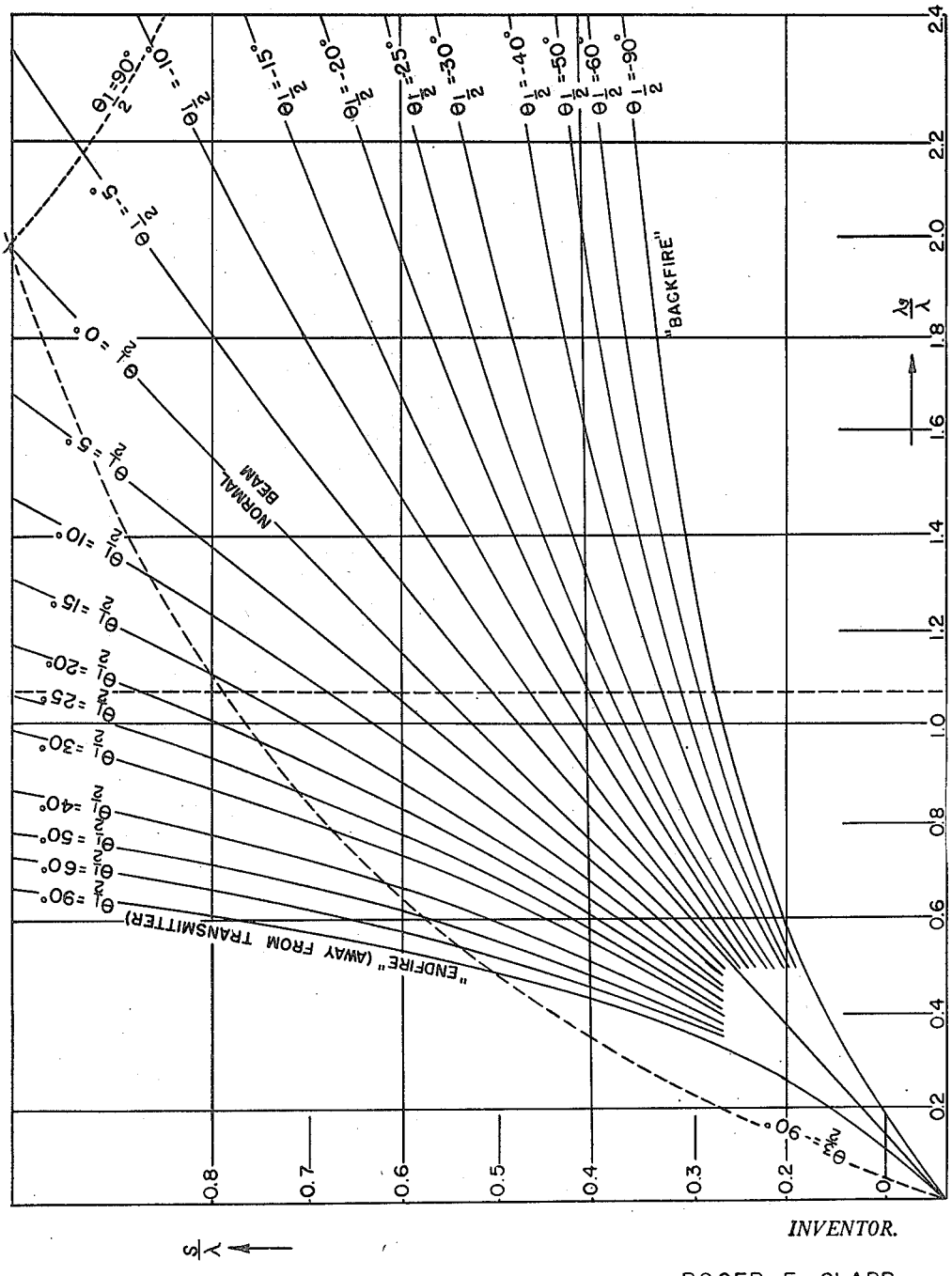

Patented Oct. 24, 1950

2,527,477

UNITED STATES PATENT OFFICE 2,527,477

CONTROL OF THE VELOCITY OF PHASE PROPAGATION OF ELECTRIC WAVES IN WAVE GUIDES

Roger E. Clapp, Cambridge, Mass., assignor, by mesne assignments, to the United States of America as represented by the Secretary of the Navy Application February 1, 1944, Serial No. 520,648

10 Claims. (Cl. 250—33.63)

This invention relates to arrangements for controllably or periodically varying the velocity of phase propagation of electro-magnetic waves in wave guides, and concerns particularly arrangements of this class adapted to form part of a scanning antenna system. The invention concerns devices for varying the velocity of phase propagation in wave guides of the type employing a multiplicity of discrete or "lumped" obstructions or discontinuities in the wave guide and concerns special forms in which such obstructions may be constituted, which forms are particularly well adapted for precisely controllable and rapidly operable variation of the phase velocity in the wave guide and also for other advantageous features more fully set forth below. Variation of the velocity of the phase propagation for a given frequency of wave is associated with variation of the wave length.

The utility, in connection with antenna systems in radio locating equipment and the like, of arrangements for varying the wave length (or phase velocity) in wave guides has been pointed out in the patent application of my colleague L. W. Alvarez, Serial No. 509,790, filed November 10, 1943. The effect of a series of ridges, grooves, slots or the like arranged on a wall of a wave guide transversely to the flow of longitudinal oscillatory currents to shorten the wave length in the wave guide, has been fully described in the patent application of my colleague M. G. White Serial No. 504,777, filed October 2, 1943.

I find that not only ridges, grooves, or pockets on the walls of a wave guide, but also obstructions suspended in the middle of a wave guide, where arranged at frequent intervals along the wave guide, will affect the velocity of phase propagation in the wave guide, increasing or decreasing it (or not affecting it at all in some cases) according to the type and amount of susceptance introduced into the wave guide, in series or in shunt as the case may be. I find that in general, any frequently repeated group of structures adapted to introduce susceptance at spaced points of the wave guide will have an effect as above described and it will be possible to transmit power in such a wave guide with relatively low standing-wave ratios provided certain rules as to the spacing between successive obstructions more fully set out below, are observed. I have derived an equation which illustrates the relation between the relative wave-length change, the spacing between the elements introducing susceptance in the wave guide and the normalized susceptance of the elements, which equation is given below, and the properties of which are illustrated in Fig. 8.

In general it will be convenient to consider the case of shunt susceptances, because of the relative simplicity of providing structures adapted to introduce shunt susceptances of either sign, but it is to be understood that by the usual transformations, involving replacing of voltages by currents, the admittance relation by the impedance relation, shunt inductances by series capacitances, etc., analogous relations can be derived for series impedances.

Not all structures adapted to introduce shunt susceptances (or series impedances, for that matter) are equally valuable for arrangements for changing the wave length in wave guides, since they will differ in the proportion of losses incurred, effectiveness of coupling with the field of the wave guide, reduction of clearances inside the wave guide (which may lead to breakdown discharges), ease of variation of the wave length changing effect, etc. The types of structures employed in apparatus of this invention are especially convenient for precisely and rapidly controlling or varying the wave length in a wave guide, and they may be provided in forms exhibiting low losses and producing a relatively small reduction of clearances in the wave guide. In general these structures introducing shunt susceptance at spaced points in the wave guide are conducting structures adapted to be rotated about an axis oriented transversely of the wave guide and located substantially in that median plane of the wave guide which is perpendicular to the direction of the electric vector of oscillations which the wave guide is intended to transmit.

An object of the invention is to provide means for rapidly or precisely varying the wave length in a wave guide, especially in a wave guide associated with a directive antenna system of variable directivity. Another object of the invention is to provide a novel and effective means of varying the wave length in a wave guide independent of the frequency of radio frequency oscillations therein (i. e. of varying the velocity of phase propagation—the "phase velocity") capable of variation of the wave length over a wide range, while maintaining conditions adapted for power transmission through said wave guide. Still another object of the invention is to provide means adapted to shorten or to lengthen the wave length in a wave guide with respect to the wave length otherwise existent therein, and also to provide means adapted cyclically to lengthen and shorten alternately the wave length in a wave guide, as compared with the wave length which would exist therein for a frequency in question in the absence of such means. Further objects of the invention will be apparent from the specification and claims.

The invention is illustrated in the annexed drawings in which.

Figure 3:
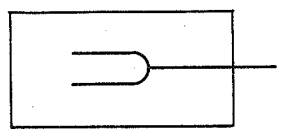
Figure 4:
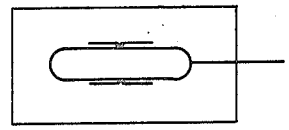
Figure 5:
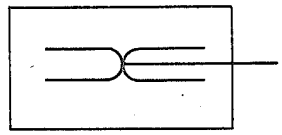

Figs. 3, 4, and 5 illustrate diagrammatically several forms of structures which may be used for introducing susceptance at spaced points in shunt with the wave guide in which it is desired to control the wave length by means of the invention;

Figs. 6 and 7 are perspective views showing typical preferred forms of structures for introducing variable shunt susceptances in wave guides for the purpose of varying the wave length in accordance with this invention;

Fig. 8 is a graph illustrating some of the properties of the relations which I have found to exist between the spacing of shunt susceptance elements in a wave guide, the normalized susceptance of such elements, the wave-length-changing effect, and the standing-wave ratio under certain conditions;

Fig. 9 is a diagram illustrating certain properties of the application of the invention to antenna systems.

Figure 1:
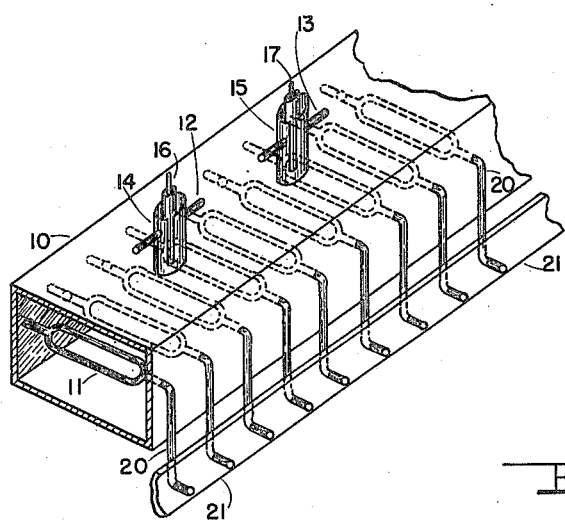
Fig. 1 shows an illustrative form of the invention, the drawing being a perspective view broken away in part.

Fig. 1 shows a portion of apparatus embodying one form of the invention which lends itself particularly well to illustrate the principles of the invention. A wave guide is shown at 10 which may be a rectangular metal pipe. The wave guide 10 is adapted to transmit waves in the $TE_{0,1}$ mode. Arranged transversely of the wave guide 10 is a group of elongated conducting rings 11. The rings are elongated in order better to conform with the shape of the wave guide. If a cylindrical wave guide were employed, circular rings might be used. The rings 11 are supported by lateral extensions in the direction of elongation of the rings. These lateral extensions extend to the walls of the wave guide and may make contact therewith, but since the rings and their extensions bridge the wave guide in a direction perpendicular to the direction of the electric vector of the oscillations of the $TE_{0,1}$ mode in the wave guide, the rings have substantially no effect on transmission in the wave guide when the plane of the rings is oriented parallel to the planes of the upper and lower walls of the wave guide. The rings are of such dimensions that when the plane of the rings is not parallel to the planes of the upper and lower walls of the wave guide (the broad walls), each ring introduces a susceptance effectively in shunt with the wave guide. This susceptance may be designed to be either capacitive or inductive, capacitive susceptances being adapted to shorten the wave length in the wave guide and inductive susceptances being adapted to lengthen the wave length in the wave guide. For certain purposes capacitive susceptances are preferred. The choice between capacitive and inductive susceptances depends partly on the type of antenna array or other system in which the wave guide is to be used and partly upon the spacing which it is desired to establish between the rings 11, as more fully pointed out in connection with Fig. 8.

It is found that the magnitude of the susceptance effectively introduced in shunt with the wave guide by one of the rings 11 depends not only upon the configuration of the ring but also upon the inclination of the plane of the ring to the median plane of the wave guide perpendicular to the orientation of the electric vector. As previously noted, if the plane of the ring is parallel to or coincides with the said median plane the susceptance introduced is practically negligible. Actually there may be a slight residual capacitive susceptance on account of the slight reduction of the effective height of the wave guide (width in the narrower cross-sectional dimension). The axis on which the rings 11 are pivoted and supported need not lie exactly in the median plane of the wave guide so long as they are perpendicular to the orientation of the electric vector (parallel to the said median plane). The median position is most practical, however, because it provides a minimum interference with the voltage breakdown characteristics of the wave guide.

It is preferred to space the rings 11 longitudinally on the wave guide with a uniform spacing because that facilitates calculation of the wave-length-control characteristics, standing-wave ratio, etc., and may also serve to keep the standing-wave ratio at a low value, other things being equal. If desired, however, the rings may be arranged in groups of two, three or more in order to make room for coupling branch wave guides, antenna elements or the like to the wave guide. If such grouping is done, there will still be a variable wave length effect and many of the advantages of the inventions may be realized in such arrangements. Arrangements are preferred, however, in which the coupling of such branch wave guides, antenna elements, or the like as are coupled to the wave guide 10 do not interfere with the desired uniform spacing of the susceptance-introducing elements, as for instance in the case of Fig. 2.

In Fig. 1, dipoles 12 and 13 are shown which may form part of an antenna array of the electrically scanned type described in the said patent application of L. W. Alvarez. As mentioned in the said application, successive dipoles of such an array may be provided with a phase reversal which is additional to the phase difference produced by the intervening portions of the main feed wave guide, so that the spacing between successive dipoles for the production of a single directive beam may be of the order of one half the wave length in the wave guide, instead of in the order of one wave length in the wave guide. The dipoles 12 and 13 are supported on and coupled to the wave guide 10 by means of the respective structures 14 and 15, the construction of which is more fully described in the said patent application of L. W. Alvarez. Adjustable probes 16 and 17, extending into the wave guide 10, serve to adjust the intensity of excitation of the respective dipoles.

The rings 11 are adapted to be rotated about their supporting axes in unison in order that a substantially uniform wave-length change may be produced in the portion of wave guide occupied by the series of rings. Various ways may be used to rotate the rings together. Thus the rings may have crank-like extensions 20 of their respective axes extending through the wave guide on one of the narrow walls of the wave guide. These cranks may be operated together by a link member 21. The rings 11 may also be rotated by means of gears acting on their axes and located outside the wave guide, but when a gear drive is used, care should be taken to minimize backlash when the apparatus is desired for use in connection with accurate measurements. Since the gear drives may be continuously driven in one direction at a uniform rate, a certain amount of backlash in the gearing can be tolerated in practice.

The dimensions of the rings 11 are to be determined in accordance with known practice to provide the desired susceptance when inserted in the wave guide. These dimensions may be estimated by theoretical calculations or they may be determined by experiment in accordance with known techniques. The properties of rings of this type mounted in wave guides have been investigated in connection with arrangements in which such rings provide a switching action or the like, a resonant ring (substantially zero susceptance but high conductance because of resonance effects) being usually preferred for switching purposes. Pipe wave guides operating in the "lowest" or dominant TE mode ($TE_{0,1}$ in rectangular pipe and $TE_{1,1}$ in round pipe) are used because the electric field has no longitudinal component and a straight shaft can easily be inserted which will everywhere be perpendicular to the electric field. Other modes meeting these requirements might be used and the latter requirement might even be effectively avoided by using a shaft of dielectric material. By the "lowest" mode is meant the one with the lowest "cut-off" frequency for a given pipe cross-section.

Figure 2:
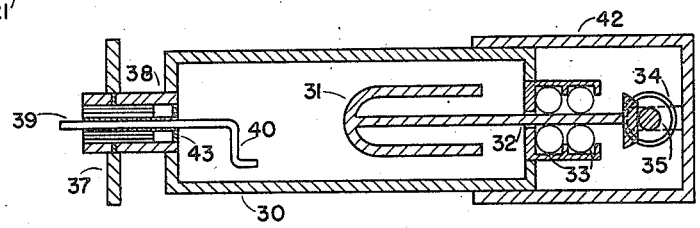
Fig. 2 is a cross-section of another embodiment of the invention.

Fig. 2 shows, in cross-section, another form of apparatus according to this invention. The wave guide in which it is desired to vary controllably the velocity of phase propagation is shown at 30. One of the susceptance elements corresponding to the rings 11 of Fig. 1, is shown at 31 mounted on a shaft 32. The element 31 may be regarded as a half-ring which has been moved over in the wave guide so as to bring the vertical portion of it closer to the center of the wave guide, in order that the coupling may be greater. The shaft 32 is mounted in ball bearings, as shown at 33, and is adapted to be driven by a bevel-gear engagement shown at 34. By means of bevel gears the drive shaft 35 may be employed to rotate a group of shafts similar to the shaft 32, each bearing susceptance-introducing structures similar to the structure 31. The susceptance-introducing structure 31 may be arranged so that that portion of it which is perpendicular to the shaft 32 is located near the center of the wave guide and so that the other portion of the element 31 extends back towards the bearing 33, thereby leaving the left-hand portion of the cross-section of the wave guide clear, so that coupling arrangements for transferring energy to or from antenna elements or the like may be introduced whenever desired. Such an antenna element is shown coupled to the wave guide 30 in the left-hand portion of Fig. 2. This antenna element includes the dipole 37 and the supporting and coupling structure 38, these being organized in the same manner as the dipole 12 and 13 and the supporting structures 14 and 15 of Fig. 1, in the manner more fully described in the above-mentioned patent application of L. W. Alvarez. In this case, however, the adjustable coupling probe, which is here shown at 39, has a bent portion 40, for since the antenna element is mounted on the narrow side of the wave guide, it is necessary that the probe should be bent inside the wave guide in order to enable it to pick up energy from the oscillating electric field of the wave guide.

A housing such as that shown at 42 may be provided around the mechanical drive system so that the wave guide 30 may conveniently be operated at pressures higher than the pressure of the surrounding air, if desired, for the purpose of reducing the breakdown voltage. The insulating annulus 43 serves as a pressure seal to maintain pressure in the wave guide 30. Such pressure-maintaining arrangements are particularly useful for equipment intended to be used in aircraft at high altitudes.

The form of susceptance-introducing structure shown in Fig. 2 is one of the most convenient of the simpler forms. Other forms may be provided, such, for instance, as the forms respectively shown diagrammatically in Figs. 3, 4, and 5. The form shown in Fig. 5 may be regarded as a ring of which the two halves have been separated and joined together "back to back." In general the susceptance-introducing structures have at least one cross-head which is transverse to the axis of rotation and one or more balanced pairs of structures extending more or less parallel to such axis, acting to "tune" the cross-head, without furnishing much additional coupling with the electric field. The structure of Fig. 4 has four different parts in general alignment with the electric field (for the position of maximum susceptance).

Fig. 6 is a perspective view of a form of susceptance-introducing structure which has been found to be particularly advantageous, exhibiting low losses and other such desirable properties. The form of this susceptance element is very much like the form of the element 31 of Fig. 2. The element shown in Fig. 6 may be made out of a piece of brass rod, axial holes being cut in one end, a wide longitudinal slot being cut in the portion in which the hole was drilled and finally the other end being rounded off as illustrated in the drawing. The element may then be mounted upon a shaft 45 which may be pressed, soldered or screwed into a suitable axial recess in the body of the element (i. e. into the cross-head portion).

Fig. 7 shows a form of susceptance-introducing structure which is capable of introducing capacitive susceptance in some positions and inductive susceptance in other positions, whereas for certain intermediate positions capacitive and inductive effects cancel, as do also the corresponding reflection effects. The general form of the structure shown in Fig. 7 resembles that of the structure shown in Fig. 6, but there are two slots provided instead of one and the slots are preferably somewhat narrower. The slots are of unequal length, the slot 48 being short and the slot 49 being long. The lengths of the slots 48 and 49 are so arranged that at the frequency of operation the slot 49 will produce an inductive effect and the slot 48 will produce a capacitive effect. Thus, when the element shown in Fig. 7 is oriented so that the slot 48 is perpendicular to the direction of the electric vector of the oscillations in the wave guide, the element will exhibit a capacitive susceptance which will appear in shunt with the wave guide, this capacitive susceptance being the maximum capacitive susceptance which the element of Fig. 7 is capable of introducing. When the element of Fig. 7 is oriented so that the median plane of the slot 49 is perpendicular to the electric vector of oscillations in the wave guide, the element of Fig. 7 will then introduce a maximum inductive susceptance effect. For other positions of the element of Fig. 7 in the wave guide (always assuming that the shaft 50 is perpendicular to the direction of the electric vector) various values of susceptance will be introduced in the wave guide, which values will be intermediate between the aforementioned extreme capacitive and inductive values. For some angular position of the element of Fig. 7, as it is rotated about the axis of the shaft 50, the inductive and capacitive effects will cancel. The nature of the structure is such that the reflection effects will also substantially cancel (the elements then behaving quite unlike a resonant ring which, although it also provides zero susceptance, introduces a very high admittance, practically a short circuit, instead of a low admittance). The use of element shown in Fig. 7 instead of the element 31 in an arrangement such as Fig. 2 permits the variation of the wave length in both directions from the wave length that would exist in the wave guide 30 in the absence of any such elements at all. The advantages of that type of operation may be seen by reference to Fig. 8.

Fig. 8 illustrates the relation between the susceptance of the susceptance-introducing structures, the spacing between centers of successive structures and the wave length in the wave guide. I have found by mathematical analysis that these quantities are related by the following equation:

$$B = \frac{\cos \beta s - \cos\left(\beta s \frac{\lambda 1}{\lambda 2}\right)}{\sin \beta s}$$

in which $\lambda_1$ is the wave length in the wave guide in the absence of any susceptance-introducing elements (that is, when B equals zero), B is a normalized value of the susceptance of each element introduced in shunt to the wave guide by each element, the normalizing being such that $$B = \frac{B'}{2Y_0}$$

where B' is the shunt susceptance introduced by the ring and $Y_0$ is the characteristic admittance of the wave guide; $s$ is the spacing between successive elements, $\lambda_2$ the wave length resultant in the guide through the action of the susceptance elements, and $\beta$ is equal to $2\pi/\lambda_1$.

In Fig. 8, B is plotted against $s/\lambda_1$, the various solid curves corresponding to specified values of $\lambda_2/\lambda_1$. Certain limiting curves are also shown beyond which no transmission takes place. Further curves might be drawn for values of $s/\lambda_1$ greater than 0.5, for although practically no transmission is possible for the spacing of $0.5\lambda_1$, transmission will be possible for certain values of spacing greater than $0.5\lambda_1$. In general such spacings are not preferred because with such spacing the wave length variation that can be accomplished with elements having a given maximum susceptance is smaller than that obtainable with the corresponding spacing in the range between 0 and $0.5\lambda_1$.

Also shown on Fig. 8 are contours indicating the standing-wave ratio that is observed when a wave guide containing successive susceptance-introducing structures is coupled to a section of wave guide having no such structures but being otherwise similar, it being so assumed that the transmission line having the susceptance-introducing structures is matched at the far end. The standing-wave ratio contours are indicated by dotted lines, the value of the standing wave ratio being given in terms of power (i. e. in terms of $r^2$).

In actual practice a small additional effect upon the wave length may be produced by the coupling probes or junctions associated with the wave guide for the purpose of feeding antennas and the like. Susceptances appearing at such junctions are in general small compared to the susceptances that can be produced by the rotating susceptance elements of the types here described, so that for general consideration such effects may be neglected. Some slight departures from theoretically predicted results may be expected on account of these minor effects, however.

It will be seen from Fig. 8 that for elements of the types shown in Fig. 6 with the slot depths so arranged that the structures introduce capacitive susceptance, the spacing should be of the order of $0.1\lambda_1$ to about $0.35\lambda_1$, the smaller values of spacing being more suitable for large amplitude variations of wave length (large maximum susceptances) and the larger values of spacing being useful only for smaller ranges of wavelength change. Use of the closer spacings is likely to be limited by mechanical considerations, since it may be difficult to provide elements capable of introducing large maximum susceptances so constructed that they do not interfere with each other when they revolve. If mechanical considerations and space limitations forbid the use of elements capable of introducing large maximum susceptances in a particular apparatus at the narrower values of spacing, a wider spacing may have to be used. It is expected that on the whole, spacings of the order of $0.2\lambda_1$ will usually be found to be best for capacitive elements of the types shown in Fig. 6. In the case of inductive elements, as may be seen from the standing-wave ratio curves, the situation is to some extent reversed, the longer spacings, such as $0.35\lambda_1$ or $0.4\lambda_1$ being more suited for relatively wide range variation of the wave length.

For variation of the wave length on both sides of the $\lambda_1$ values, as in the case in which structures of the type shown in Fig. 7 are used, values of $s$ in the middle range, that is to say from about $0.2\lambda_1$ to about $0.3\lambda_1$ appear to be best. At these spacings the higher standing-wave ratios can be best avoided at the extremes of the cycle when the cycle extends approximately symmetrically on both sides of the horizontal axis.

Simultaneous rotation of the susceptance-introducing structures in the wave guide will continuously vary the susceptance of each element while leaving the spacing unaffected so that the variation of the ratio $\lambda_2/\lambda_1$ will correspond to the movement of a point along a vertical line in Fig. 8 with respect to the contours of $\lambda_2/\lambda_1$. There will be a similar variation of standing-wave ratio.

The variation of the standing-wave ratio in an ordinary wave guide system feeding a wave guide of variable wave length characteristics organized in accordance with the present invention may be reduced by providing a gradual tapering from the empty wave guide into the wave guide provided with successive susceptance-introducing structures. Such a tapering may be provided by adding an additional number of susceptance-introducing structures at the end of the series of elements and progressively varying the inherent susceptance characteristics of the elements to provide a transition between the empty guide and the guide provided with the series of similar susceptance-producing structures. If desired these structures in the "tapered" section may be provided in pairs of similar structures, or they may all be different from one another. The "tapering" effects may be provided by changing the length of the structures (in the case of structures of the form shown at 31 in Fig. 2, cutting off the free ends of the structures) or by shifting the position of the susceptance-producing structure in the wave guide laterally of the wave guide in order to vary the coupling, or again by changing the position of the portion of the structure which is substantially perpendicular to the axis about which the element revolves. In all these arrangements, the outer elements, which is to say the elements closer to the empty wave guide, will produce a varying susceptance effect which has a smaller amplitude than the varying susceptance effect provided by the similar elements of the main series of elements, but this smaller variation will be in phase with the variation of the other elements. In this manner there may be accomplished a fairly gradual transition from a wave guide of unvarying velocity of phase progation, through a wave guide in which there is a progressively increasing variation of velocity of phase propagation, to a wave guide to which there is a considerable variation of velocity of phase propagation of about the same extent over the length of such wave guide. A taper-section extending over about 2 or 3 times the mean wave length in the wave guide will usually be satisfactory, even for apparatus in which a relatively wide range variation of the velocity of phase propagation is performed. For apparatus operating over a relatively short range of phase-velocity variation and having favorable spacing between susceptance-introducing structures with respect to standing-wave ratio characteristics, shorter taper-sections may successfully be used.

Fig. 9 is a diagram showing the scanning characteristics of an antenna array of the linear type in which the phasing of successive elements can be uniformly varied. In this diagram $s/\lambda$, in which $s$ is the spacing between elements of the array and $\lambda$ is the wave length in open air, is plotted as ordinate against $\lambda_g/\lambda$ in which $\lambda_g$ is the wave length in a wave guide from which the antenna elements may be simultaneously fed and is therefore proportional to the phasing of successive antennas.

The solid lines indicate contours of constant beam angle. The portions of the diagram lying above the dotted lines are not useful for scanning because of interference from extra order beams.

When wave-guide-width variation is employed for changing the wave length in the wave guide and thereby changing the phasing of the antennas of an array, it is not practical to operate in the region to the left of the vertical dotted line corresponding to a value of $\lambda g/\lambda$ equal to about 1.15, because of the possibility of interference from the $TE_{2,0}$ mode of transmission. Thus with that type of arrangement it is practical to transmit beams at large angles to the plane normal to the array only in the "backfire" sense. With wave length variation of the type described herein, especially with capacitive susceptance-introducing structures, possibilities of a considerably wider range of scan become available. It might even be possible by working at a value of $s/\lambda$ of about 0.3 to provide a scan extending from the normal beam position to a "backfire" beam substantially parallel to the axis of the array, and then to provide another quadrant of scan by feeding the array from the other end. In this manner 180 degrees of coverage might be provided.

A great advantage of the rotatable elements providing variable susceptance loading in the wave guide as constituted in accordance with this invention is that the mechanical motion providing the actuation of the elements to vary their electrical effects may all be introduced by rotating shafts so oriented that they will pick up substantially no energy from the wave guide and will involve substantially no contact losses where they pass through the wave guide walls even in the absence of any special arrangements to reduce contact losses. Elaborate choke arrangements are unnecessary and, moreover, it is an advantage to be able to avoid the sensitivity sometimes possessed by such arrangements with respect to the change of the wave length in the wave guide and other factors. With the preferred types of susceptance-introducing elements, certain illustrative forms of which are shown in Fig. 6 and Fig. 7, energy losses associated with the elements are low and the wave guide in which the elements are situated is able to transmit considerable amounts of power without danger of breakdown discharges. As above pointed out, arrangements of this invention lend themselves readily to operation above atmospheric pressure in connection with "pressurized" wave guide systems, so that further reduction of the breakdown voltage and of the power handling capabilities of the devices are possible in this manner.

What is claimed is:

1. An antenna system of variable directional characteristics including a substantially straight rectangular wave guide, a multiplicity of uniformly spaced antenna elements mounted on a broad wall of said wave guide in energy transferring relationship therewith, a multiplicity of rotatable conducting loops distributed longitudinally of said wave guide in the region of said antenna elements, each of said loops being rotatable about an axis perpendicular to the orientation of the electric field vector of the dominant mode of oscillations adapted to be transmitted in said wave guide, each of said loops introducing an inductive susceptance in shunt with said wave guide, which susceptance has nonzero values for at least some rotational positions of the loop and varies in value with said rotational position, and means for simultaneously and synchronously rotating said loops about their respective axes.

2. Apparatus in accordance with claim 1 wherein the spacing between the axes of rotation of said loops is substantially less than one half the wave length of the oscillations transmitted by said wave guide as measured within said wave guide in the absence of said loops.

3. High frequency directional apparatus comprising, a straight rectangular wave guide, a plurality of uniformly spaced antenna elements mounted on a wall of said wave guide in energy transferring relationship therewith, a plurality of reactive elements distributed longitudinally of said wave guide in the region of said antenna elements, each of said reactive elements being supported for rotation about an axis perpendicular to the orientation of the electric field vector of the dominant mode of oscillations adapted to be transmitted in said wave guide, each of said reactive elements introducing a susceptance in shunt with said wave guide which varies in value with the rotational position thereof, and means for uniformly cyclically varying the rotational position of said reactive elements to periodically vary the velocity of phase propagation of the electromagnetic energy within said wave guide.

4. Apparatus in accordance with claim 3 wherein said reactive elements comprise elongated flat conducting loops.

5. Apparatus in accordance with claim 3 wherein said reactive elements comprise elongated flat conducting wire loops substantially symmetrically disposed within the cross-sectional area of said wave guide.

6. Apparatus in accordance with claim 3 wherein each of said reactive elements comprises at least one U-shaped structure having its open end directed toward a narrow wall of said wave guide.

7. Apparatus in accordance with claim 3 wherein each of said reactive elements comprises an elongated flat conducting loop having a pair of substantially linear conductive elements extending outward from the mid-point of each of the long sides of said flat loop, said conductive elements lying substantially parallel to said axis of rotation.

8. Apparatus in accordance with claim 3 wherein each of said reactive elements comprise a tubular structure, a shaft coaxial with said axis of rotation, a metallic cross-head securing said tubular structure at one end thereof to said shaft, said tubular structure being split from the end opposite said cross-head by a pair of diametrically opposed slots, the median plane of which extends through the axis of said shaft.

9. Apparatus in accordance with claim 3 wherein each of said reactive elements comprises a tubular structure, a shaft coaxial with said axis of rotation, a metallic cross-head electrically securing said tubular structure at one end thereof to said shaft, said tubular structure being split from the end opposite said cross-head by two pairs of diametrically opposed slots having median planes intersecting at right angles along the axis of said shaft, the axial length of the slots of one of said pairs being greater than that of the other of said pairs, the respective depths of said slots being arranged whereby at the frequency of operation the shorter of said pairs of slots introduces inductive reactance and the longer of said pairs of slots introduces capacitive reactance.

10. High frequency directional apparatus comprising, a rectangular wave guide, a plurality of spaced antenna elements mounted on a wall of said guide in energy transferring relationship, a plurality of reactive elements distributed longitudinally of said guide in the region of said antenna elements and more closely spaced than said antenna elements, each of said reactive elements being rotatable about an axis perpendicular to the orientation of the electric field vector of the dominant mode of oscillation adapted to be transmitted in said wave guide, each of said reactive elements introducing a susceptance in shunt with said wave guide, which susceptance has non-zero values for at least some rotational positions of the element and varies in value with said rotational position, and means coupled to said reactive elements for cylindrically synchronously varying the rotational position of said reactive elements periodically to vary the velocity of phase propagation of the electromagnetic energy within said wave guide.

ROGER E. CLAPP.

REFERENCES CITED

The following references are of record in the file of this patent:

UNITED STATES PATENTS

| Number | Name | Date |
|---|---|---|
| 2,234,293 | Usselman | Mar. 11, 1941 |
| 2,396,044 | Fox | Mar. 5, 1946 |
| 2,415,807 | Barrow et al. | Feb. 18, 1947 |
| 2,427,100 | Kihn | Sept. 9, 1947 |
| 2,432,093 | Fox | Dec. 9, 1947 |
| 2,433,368 | Johnson et al. | Dec. 30, 1947 |
| 2,464,276 | Varian | Mar. 15, 1949 |

Certificate of Correction

Patent No. 2,527,477    October 24, 1950

ROGER E. CLAPP

It is hereby certified that error appears in the printed specification of the above numbered patent requiring correction as follows:

Column 12, line 22, for the word "cylindrically" read *cyclically*;

and that the said Letters Patent should be read as corrected above, so that the same may conform to the record of the case in the Patent Office.

Signed and sealed this 12th day of June, A. D. 1951.

[SEAL]

THOMAS F. MURPHY,
*Assistant Commissioner of Patents.*